US009986415B2

(12) United States Patent
Cao

(10) Patent No.: US 9,986,415 B2
(45) Date of Patent: *May 29, 2018

(54) METHOD FOR SAVING STANDARD FORMAT PAGE AND SERVER

(71) Applicant: Guangdong Oppo Mobile Telecommunications Corp., Ltd., Dongguan, Guangdong (CN)

(72) Inventor: Jun Cao, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/709,068

(22) Filed: Sep. 19, 2017

(65) Prior Publication Data

US 2018/0007535 A1 Jan. 4, 2018

Related U.S. Application Data

(63) Continuation of application No. 15/583,135, filed on May 1, 2017, which is a continuation of application No. PCT/CN2016/085889, filed on Jun. 15, 2016.

(30) Foreign Application Priority Data

Jun. 19, 2015 (CN) .......................... 2015 1 0349407

(51) Int. Cl.
*H04W 64/00* (2009.01)
*H04W 8/06* (2009.01)
(Continued)

(52) U.S. Cl.
CPC ........ *H04W 8/06* (2013.01); *G06F 17/30241* (2013.01); *H04W 8/08* (2013.01);
(Continued)

(58) Field of Classification Search
CPC . H04W 84/042; H04W 60/00; H04W 76/021; H04W 88/06
See application file for complete search history.

(56) References Cited

U.S. PATENT DOCUMENTS

2010/0268674 A1* 10/2010 Dwyer .............. H04W 36/0066
706/12
2012/0252493 A1* 10/2012 Siddeley ................. H04W 4/02
455/456.2
(Continued)

FOREIGN PATENT DOCUMENTS

| CN | 1863203 A | 11/2006 |
|---|---|---|
| CN | 101252782 A | 8/2008 |

(Continued)

*Primary Examiner* — Dung Hong
(74) *Attorney, Agent, or Firm* — Younge Basile Hanlon & MacFarlane, P.C.

(57) ABSTRACT

Provided is a method for saving a standard format page. The method includes: generating a standard format page which includes a first filling entry, the first filling entry having a default filling value and being configured to be filled with a PLMN identity of a visited place; transmitting the standard format page to the first mobile terminal located at the visited place; receiving a first standard format page transmitted by the first mobile terminal, the first standard format page being a standard format page in which the first filling entry has been filled with the filling value; and identifying and saving the first standard format page. The present disclosure further provides a server for saving a standard format page.

8 Claims, 7 Drawing Sheets

(51) Int. Cl.
*H04W 8/08* (2009.01)
*H04W 8/18* (2009.01)
*G06F 17/30* (2006.01)
*G06F 17/24* (2006.01)

(52) U.S. Cl.
CPC ........... *H04W 8/18* (2013.01); *H04W 64/003* (2013.01); *G06F 17/243* (2013.01)

(56) References Cited

U.S. PATENT DOCUMENTS

| | | | | |
|---|---|---|---|---|
| 2013/0051363 A1* | 2/2013 | Swaminathan | ....... | H04W 48/16 |
| | | | | 370/331 |
| 2013/0109377 A1* | 5/2013 | Al-Khudairi | ......... | H04W 48/16 |
| | | | | 455/432.1 |
| 2016/0269899 A1* | 9/2016 | Carames | ............... | H04W 12/06 |
| 2017/0127371 A1* | 5/2017 | Jiang | .................... | H04W 60/04 |
| 2017/0196033 A1* | 7/2017 | Zhu | ..................... | H04W 76/023 |
| 2017/0289904 A1* | 10/2017 | Li | .......................... | H04W 48/18 |

FOREIGN PATENT DOCUMENTS

| | | | |
|---|---|---|---|
| CN | 101483853 A | 7/2009 |
| CN | 101541019 A | 9/2009 |
| CN | 104994492 A | 10/2015 |
| WO | 2007081123 A1 | 7/2007 |
| WO | 2012080852 A1 | 6/2012 |
| WO | 2012102862 A1 | 8/2012 |

\* cited by examiner

| FIRST FILLING ENTRY | SECOND FILLING ENTRY | THIRD FILLING ENTRY | ... |
|---|---|---|---|
| AN PLMN ID OF A VISITED PLACE | AN IDENTITY OF AN OPERATOR TO WHICH THE SIM CARD OF THE FIRST MOBILE TERMINAL BELONGS | AN IDENTITY OF AN AREA TO WHICH THE VISITED PLACE BELONGS | ... |

STANDARD FORMAT PAGE

FIG. 3

METHOD FOR SAVING STANDARD FORMAT PAGE AND SERVER

CROSS-REFERENCE TO RELATED APPLICATION(S)

This application is a continuation of U.S. application Ser. No. 15/583,135, filed on May 1, 2017, which is a continuation of International Patent Application No. PCT/CN2016/085889 filed on Jun. 15, 2016, which claims priority to Chinese Patent Application No. 201510349407.X, filed on Jun. 19, 2015. The aforementioned patent applications are hereby incorporated by reference in their entireties.

TECHNICAL FIELD

The present disclosure relates to a technical field of communication, and in particular, to a method for saving a standard format page and a server.

BACKGROUND

The public land mobile network (PLMN) is a network established and operated by the government or operators authorized by the government, for the purpose of providing the public with land mobile communication service. The network is generally connected to the public switched telephone network to form a communication network of an entire district or country scale.

The identity of the PLMN is generally a set of digits. For example, the PLMN identity of "China Mobile" is 46000, while the PLMN identity of "China Unicom" is 46001. A user can quickly and conveniently communicate via mobile networks provided by various operators. With the improvement of people's living standards, more and more people carry communication terminal equipment when traveling abroad or on a business trip. When a roaming user communicates (for example, internationally roaming), his/her mobile terminal (such as a mobile phone) has to search for a network again so as to obtain the PLMN identity.

Currently, a first mobile terminal located at a visited place is capable of transmitting the PLMN identity of the visited place to a server, such that a second mobile terminal arriving at the visited place for the first time is capable of quickly accessing the PLMN of the visited place. However, since the server does not normalize a standard format page including the PLMN identity of the visited place and transmitted by the first mobile terminal located at the visited place, various types of formats of the PLMN identities of visited places can be received by the server and the server may not be able to accurately identify the obtained PLMN identity of the visited place, and sometimes, the server fails to save the PLMN identity of the visited place.

BRIEF DESCRIPTION OF THE DRAWINGS

In order to more clearly describe technical solutions according to implementations of the present disclosure, the accompanying drawings used for describing the implementations will be briefly introduced hereinafter. Apparently, the accompanying drawings described hereinafter show some implementations of the present disclosure, and persons skilled in the art may also derive other drawings from these accompanying drawings without creative efforts.

FIG. 3 is a schematic structural diagram of contents of a first standard format page of another implementation of a method for saving a standard format page according to an implementation of the present disclosure.

DETAILED DESCRIPTION

Figure 1:
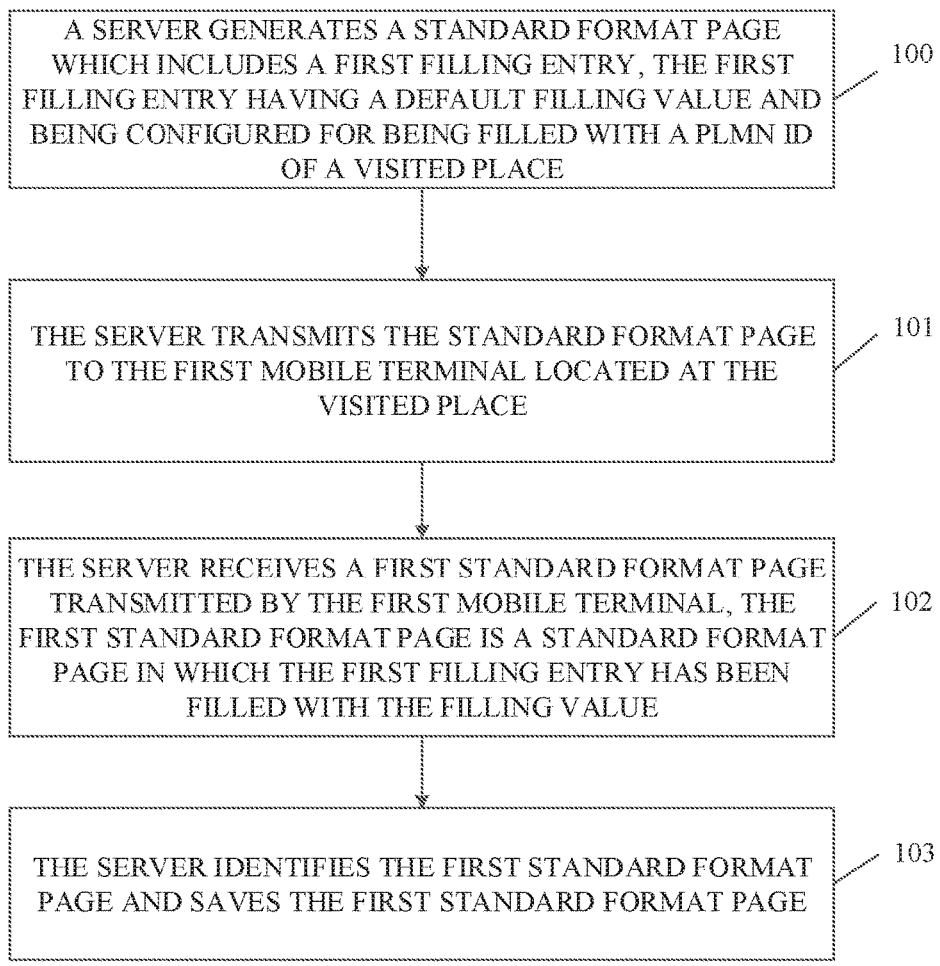
FIG. 1 is a flowchart of an implementation of a method for saving a standard format page according to an implementation of the present disclosure.

In conjunction with the drawings in the implementations of the present disclosure, a clear, complete description for the technical solutions in the implementations of the present disclosure is provided below. Apparently, the described implementations are a part rather than all of the implementations of the present disclosure. All other implementations obtained by persons skilled in the art according to the implementations of the present disclosure without creative efforts should fall within the protection scope of the present disclosure.

By means of the implementation of the present disclosure, the format of the PLMN identity of the visited place with which the mobile terminal fills the standard format page can be normalized, and the correctness of the server identifying the PLMN identity of the visited place can be improved.

The terms "first", "second", "third", "fourth" and so forth in the description, claims, and drawings are used to distinguish different objects, not for describing a specific sequence. In addition, the terms "including", "having" and any variants thereof are intended to cover non-exclusive inclusions. For example, a process, a method, a system, a product, or an equipment including a series of steps or units is not limited to the listed steps or units, but optionally further includes steps or units not listed herein, or optionally further includes other steps or units inherent in the process, method, product or equipment.

The public land mobile network (PLMN) is a network established and operated by the government or an operator authorized by the government, for the purpose of providing land mobile communication service for the public. The network is generally connected to the Public Switched Telephone Network to form a communication network of an entire district or country scale. PLMN=MCC (mobile country code)+MNC (mobile network code), for example, the PLMN of "China Mobile" is 46000, 46002, 46007, 46008, while the PLMN of "China Unicom" is 46001, 46006, 46009. PLMN is a wireless communication system that is dedicated to, for example, vehicles or walking mobile users. However, users of the mobile and portable Internet are becoming more and more. An ideal PLMN system is capable of providing service comparable to a fixed network for the users of the mobile and portable Internet.

The EPLMN (equivalent PLMN) is a PLMN equivalent to the PLMN currently selected by a mobile communication terminal and they have the same priority.

The HPLMN (home PLMN) is a PLMN to which the user of the mobile communication terminal belongs. That is to say, the MCC and MNC contained in the IMSI (international mobile subscriber identification number) of the USIM (universal subscriber identity module) card of the mobile communication terminal are consistent with the MCC and MNC in the HPLMN. For a certain user, there is only one HPLMN.

The VPLMN (visited PLMN) is a PLMN of a visited place visited by the user of the mobile communication terminal. The PLMN is not exactly consistent with the MCC and MNC of the IMSI recorded in the SIM (subscriber identity module) card. When the mobile terminal loses the coverage of the PLMN, the mobile terminal will select a VPLMN.

Referring to FIG. 1, a flowchart of an implementation of a method for saving a standard format page according to an implementation of the present disclosure is illustrated. The server may be a cloud platform or a cloud space. A first mobile terminal may be, for example, a mobile phone, a tablet, a notebook computer, a palmtop, a mobile internet device (MID), a wearable device (such as a smart watch), a smart bracelet, a pedometer and so forth) or other terminal equipment capable of searching for networks.

As illustrated in FIG. 1, an implementation of a method for saving a standard format page according to an implementation of the present disclosure can begin at block 100.

At block 100: a server generates a standard format page which includes a first filling entry, the first filling entry having a default filling value and being configured to be filled with a PLMN identity of a visited place.

In an implementation, since there are various types of mobile terminals as well as various types of formats of transmitted PLMN identities of visited places, the server has to unify the standard formats of PLMN identities of visited places transmitted by mobile terminals, such that PLMN identities of visited places transmitted by various mobile terminals can be correctly identified. Thus, the server can transmit a standard format page to mobile terminals. The standard format page includes at least one filling entry having a default filling value. The at least one filling entry includes a first filling entry configured to prompt the first mobile terminal to fill the first filling entry with the PLMN identity of the visited place. In at least one implementation, the standard format page may further include a second filling entry and a third filling entry configured to be filled with an identity of an operator to which s SIM card of the first mobile terminal belongs or an identity of an area to which the visited place belongs.

At block 101: the server transmits the standard format page to the first mobile terminal located at the visited place.

In an implementation, the server transmits the standard format page to the first mobile terminal located at the visited place after generating the standard format page. In at least one implementation, the server can obtain the location information of the first mobile terminal so as to obtain the location of the first mobile terminal and determine that the first mobile terminal is located at the visited place.

At block 102: the server receives a first standard format page transmitted by the first mobile terminal, the first standard format page is a standard format page in which the first filling entry has been filled with the filling value.

In an implementation, the first mobile terminal receives the standard format page and fills the first filling entry with the PLMN identity of the visited place stored in the first mobile terminal according to the type of the filling value in the first filling entry in the standard format page, so as to generate the first standard format page.

At block 103: the server identifies the first standard format page and saves the first standard format page.

In an implementation, after receiving the first standard format page transmitted by the first mobile terminal, the server identifies the content of every filling entry in the first standard format page, and finally, saves the identified first standard format page.

By means of the implementation of the present disclosure, the server generates the standard format page which includes the first filling entry, the first filling entry having the default filling value and being configured to be filled with the PLMN identity of the visited place; the server transmits the standard format page to the first mobile terminal located at the visited place; the server receives the first standard format page transmitted by the first mobile terminal, the first standard format page being a standard format page in which the first filling entry has been filled with the filling value; the server identifies the first standard format page and saves the first standard format page. The server unifies format of the PLMN identity of the visited place with which the mobile terminal fills the standard format page, such that the server can identify the PLMN identity of the visited place in the standard format page, thereby improving the accuracy of the server identifying the PLMN identity of the visited place.

Figure 2:
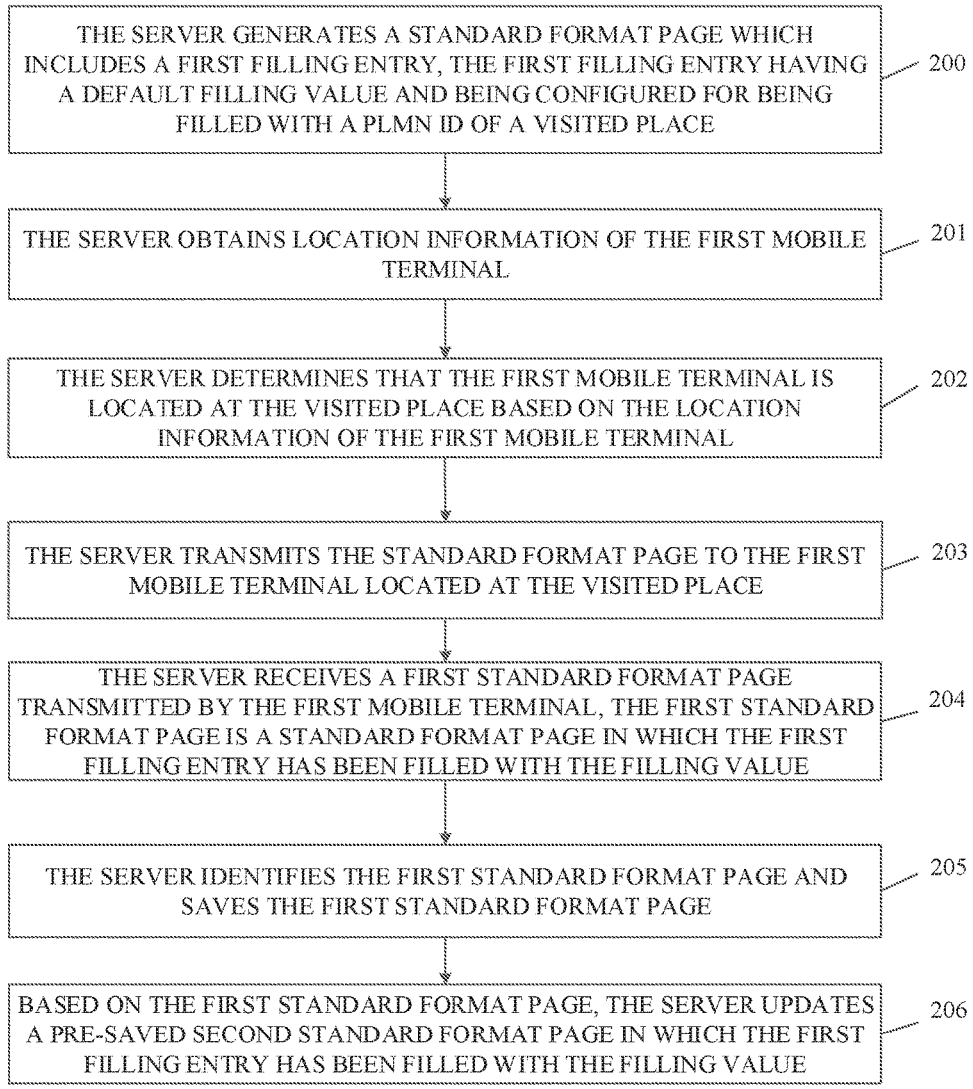
FIG. 2 is a flowchart of another implementation of a method for saving a standard format page according to an implementation of the present disclosure.

Referring to FIG. 2, a flowchart of another implementation of a method for saving a standard format page according to an implementation of the present disclosure is illustrated. The server may be a cloud platform or a cloud space. A first mobile terminal may be, for example, a mobile phone, a tablet, a notebook computer, a palmtop, a mobile internet device (MID), a wearable device (such as a smart watch), a smart bracelet, a pedometer and so forth) or other terminal equipment capable of searching for networks.

As illustrated in FIG. 2, another implementation of a method for saving a standard format page according to an implementation of the present disclosure can begin at block 200.

At block 200: the server generates a standard format page which includes a first filling entry, the first filling entry having a default filling value and being configured to be filled with a PLMN identity of a visited place. The operation at block 200 may correspond to the operation at block 100 as illustrated in FIG. 1.

In an implementation, since there are various types of mobile terminals as well as various types of formats of transmitted PLMN identities of visited places, the server has to unify the standard formats of PLMN identities of visited places transmitted by mobile terminals, such that PLMN identities of visited places transmitted by various mobile terminals can be correctly identified. Thus, the server can transmit a standard format page to mobile terminals. The standard format page includes at least one filling entry having a default filling value. The at least one filling entry includes a first filling entry configured to prompt the first mobile terminal to fill the first filling entry with the PLMN identity of the visited place.

In one implementation, the standard format page may further include a second filling entry and a third filling entry. The second filling entry is configured to be filled with an identity of an operator to which the SIM card of the first mobile terminal belongs, while the third filling entry is configured to be filled with an identity of an area to which the visited place belongs. In at least one implementation, the content of the standard format page is as illustrated in FIG. 3. The standard format page includes K entries, where K is a positive integer, such as 1, 3, 5, 9, 12 and so forth. In the standard format page, the first filling entry is configured to store the PLMN identity of the visited place (VPLMN). In at least one implementation, the standard format page may further include the second filling entry configured to save the identity of the operator to which the SIM card of the first mobile terminal belongs. In at least one implementation, the standard format page may further include the third filling entry configured to save the identity of the area to which the visited place belongs.

At block 201: the server obtains location information of the first mobile terminal.

In an implementation, the server may transmit a request of obtaining the location information to the first mobile terminal which may be positioned by the GPS (Global Positioning System) or base stations in a mobile operation network. The GPS-based positioning method positions the first mobile terminal by means of a GPS unit of the first mobile terminal transmitting its own position information to a background positioning program. The positioning method utilizing base stations positions the first mobile terminal based on the distance from each of the base stations to the first mobile terminal. In the latter method, the first mobile terminal is not required to be capable of positioning itself utilizing the GPS, however, the accuracy greatly depends on the distribution of the base stations and their coverage ranges. The first mobile terminal transmits the location information of the first mobile terminal to the server after positioning such that the server obtains the location of the first mobile terminal.

At block 202: the server determines that the first mobile terminal is located at the visited place based on the location information of the first mobile terminal.

In an implementation, the server determines whether the first mobile terminal is located at the visited place after obtaining the location information of the first mobile terminal. The standard format page is transmitted to the first mobile terminal when the first mobile terminal is located at the visited place.

At block 203: the server transmits the standard format page to the first mobile terminal located at the visited place. The operation at block 203 may correspond to the operation at block 101 as illustrated in FIG. 1.

In an implementation, the server transmits the standard format page to the first mobile terminal located at the visited place after generating the standard format page.

At block 204: the server receives a first standard format page transmitted by the first mobile terminal, the first standard format page is a standard format page in which the first filling entry has been filled with the filling value. The operation at block 204 may correspond to the operation at block 102 as illustrated in FIG. 1.

In an implementation, the first mobile terminal receives the standard format page and fills the first filling entry with the PLMN identity of the visited place stored in the first mobile terminal according to the type of the filling value in the first filling entry in the standard format page, so as to generate the first standard format page and transmit the generated first standard format page to the server.

At block 205: the server identifies the first standard format page and saves the first standard format page. The operation at block 205 may correspond to the operation at block 103 as illustrated in FIG. 1.

In an implementation, after receiving the first standard format page transmitted by the first mobile terminal, the server identifies the first standard format page according to the standard format of the block 200, and finally, saves the identified first standard format page.

At block 206: based on the first standard format page, the server updates a pre-saved second standard format page in which the first filling entry has been filled with the filling value.

In an implementation, the server may substitute the first standard format page for the pre-saved second standard format page, such that the standard format page stored in the server is always the newest standard format pages. The second standard format page is a standard format page in which the first filling entry has been filled with the filling value, and the PLMN identity of the visited place in the first filling entry in the second standard format page is of the same type as the PLMN identity of the visited place in the first filling entry in the first standard format page.

By means of the implementation of the present disclosure, the server generates the standard format page which includes the first filling entry, the first filling entry having the default filling value and being configured to be filled with the PLMN identity of the visited place; the server transmits the standard format page to the first mobile terminal located at the visited place; the server receives the first standard format page transmitted by the first mobile terminal, the first standard format page being a standard format page in which the first filling entry has been filled with the filling value; the server identifies the first standard format page and saves the first standard format page. The server unifies format of the PLMN identity of the visited place with which the mobile terminal fills the standard format page, such that the server can identify the PLMN identity of the visited place in the standard format page, thereby improving the accuracy of the server identifying the PLMN identity of the visited place.

Figure 4:
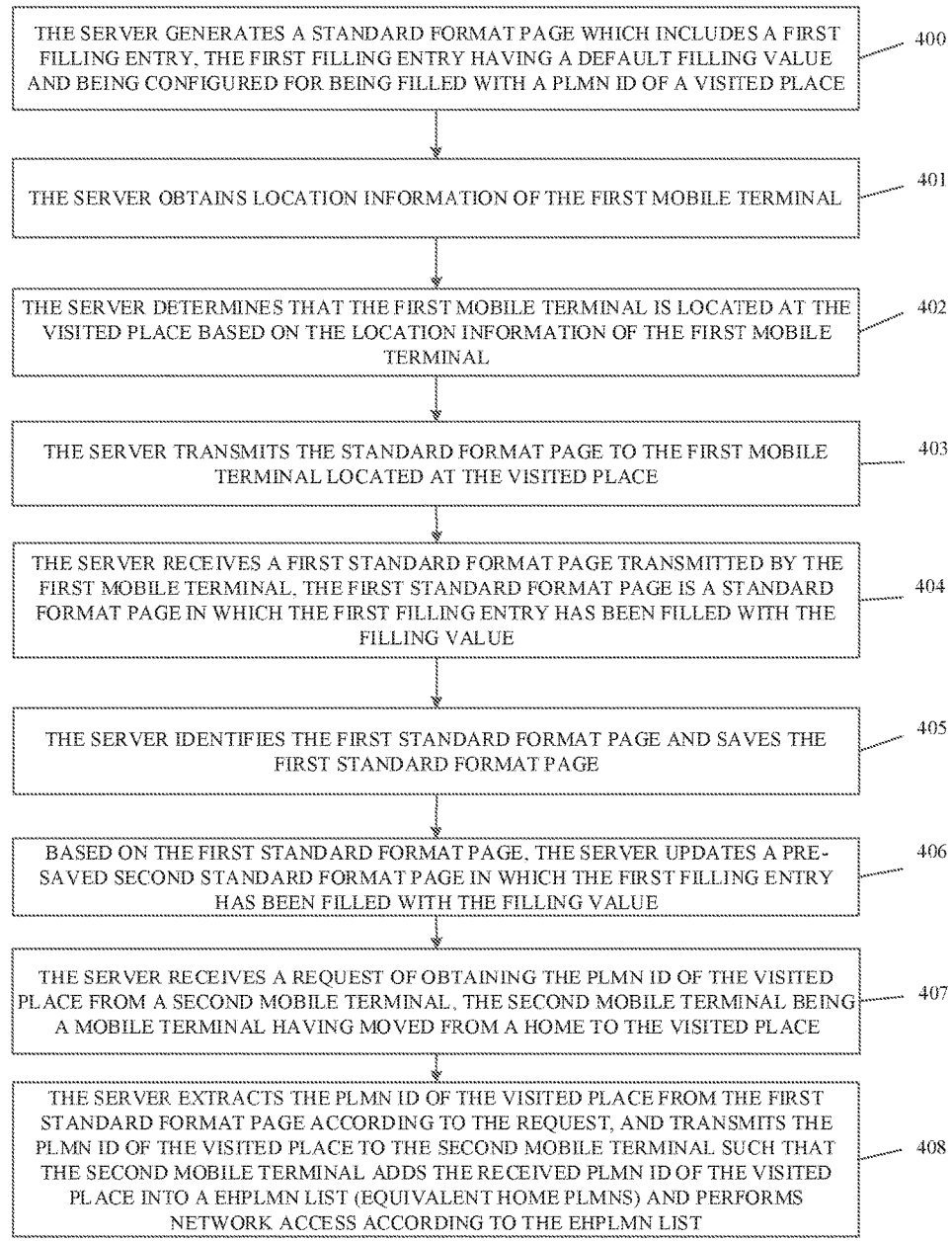
FIG. 4 is a flowchart of another implementation of a method for saving a standard format page according to an implementation of the present disclosure.

Referring to FIG. 4, a flowchart of another implementation of a method for saving a standard format page according to an implementation of the present disclosure is illustrated. The server may be a cloud platform or a cloud space. A first mobile terminal may be, for example, a mobile phone, a tablet, a notebook computer, a palmtop, a mobile internet device (MID), a wearable device (such as a smart watch), a smart bracelet, a pedometer and so forth) or other terminal equipment capable of searching for networks.

As illustrated in FIG. 4, another implementation of a method for saving a standard format page according to an implementation of the present disclosure can begin at block 400.

At block 400: the server generates a standard format page which includes a first filling entry, the first filling entry having a default filling value and being configured to be filled with a PLMN identity of a visited place. The operation at block 400 may correspond to the operation at block 100 as illustrated in FIG. 1 and the operation at block 200 as illustrated in FIG. 2.

In an implementation, since there are various types of mobile terminals as well as various types of formats of transmitted PLMN identities of visited places, the server has to unify the standard formats of PLMN identities of visited places transmitted by mobile terminals, such that PLMN identities of visited places transmitted by various mobile terminals can be correctly identified. Thus, the server can transmit a standard format page to mobile terminals. The standard format page includes at least one filling entry having a default filling value. The at least one filling entry includes a first filling entry configured to prompt the first mobile terminal to fill the first filling entry with the PLMN identity of the visited place.

In one implementation, the standard format page may further include a second filling entry and a third filling entry. The second filling entry is configured to be filled with an identity of an operator to which a SIM card of the first mobile terminal belongs, while the third filling entry is configured to be filled with an identity of an area to which the visited place belongs. In at least one implementation, the content of the standard format page is as illustrated in FIG. 3. The standard format page includes K entries, where K is a positive integer, such as 1, 3, 5, 9, 12 and so forth. In the standard format page, the first filling entry is configured to store the PLMN identity of the visited place (VPLMN). In at least one implementation, the standard format page may further include the second filling entry configured to save the identity of the operator to which the SIM card of the first mobile terminal belongs. In at least one implementation, the standard format page may further include the third filling entry configured to save the identity of the area to which the visited place belongs.

At block 401: the server obtains location information of the first mobile terminal. The operation at block 401 may correspond to the operation at block 201 as illustrated in FIG. 2.

In an implementation, the server may transmit a request of obtaining the location information to the first mobile terminal which may be positioned by the GPS (Global Positioning System) or base stations in a mobile operation network. The GPS-based positioning method positions the first mobile terminal by means of a GPS unit of the first mobile terminal transmitting its own position information to a background positioning program. The positioning method utilizing base stations positions the first mobile terminal based on the distance from each of the base stations to the first mobile terminal. In the latter method, the first mobile terminal is not required to be capable of positioning itself utilizing the GPS, however, the accuracy greatly depends on the distribution of the base stations and their coverage ranges. The first mobile terminal transmits the location information of the first mobile terminal to the server after positioning such that the server obtains the location of the first mobile terminal.

At block 402: the server determines that the first mobile terminal is located at the visited place based on the location information of the first mobile terminal. The operation at block 402 may correspond to the operation at block 202 as illustrated in FIG. 2.

In an implementation, the server determines whether the first mobile terminal is located at the visited place after obtaining the location information of the first mobile terminal. The standard format page is transmitted to the first mobile terminal when the first mobile terminal is located at the visited place.

At block 403: the server transmits the standard format page to the first mobile terminal located at the visited place. The operation at block 403 may correspond to the operation at block 101 as illustrated in FIG. 1 and the operation at block 203 as illustrated in FIG. 2.

In an implementation, the server transmits the standard format page to the first mobile terminal located at the visited place after generating the standard format page.

At block 404: the server receives a first standard format page transmitted by the first mobile terminal, the first standard format page is a standard format page in which the first filling entry has been filled with the filling value. The operation at block 404 may correspond to the operation at block 102 as illustrated in FIG. 1 and the operation at block 204 as illustrated in FIG. 2.

In an implementation, the first mobile terminal receives the standard format page and fills the first filling entry with the PLMN identity of the visited place stored in the first mobile terminal according to the type of the filling value in the first filling entry in the standard format page, so as to generate the first standard format page and transmit the generated first standard format page to the server.

At block 405: the server identifies the first standard format page and saves the first standard format page. The operation at block 405 may correspond to the operation at block 103 as illustrated in FIG. 1 and the operation at block 205 as illustrated in FIG. 2.

In an implementation, after receiving the first standard format page transmitted by the first mobile terminal, the server identifies the first standard format page according to the standard format of the block 400, and finally, saves the identified first standard format page.

At block 406: based on the first standard format page, the server updates a pre-saved second standard format page in which the first filling entry has been filled with the filling value. The operation at block 406 may correspond to the operation at block 206 as illustrated in FIG. 2.

In an implementation, the server may substitute the first standard format page for the pre-saved second standard format page, such that the standard format page stored in the server is always the newest standard format pages. The second standard format page is a standard format page in which the first filling entry has been filled with the filling value, and the PLMN identity of the visited place in the first filling entry in the second standard format page is of the same type as the PLMN identity of the visited place in the first filling entry in the first standard format page.

At block 407: the server receives a request of obtaining the PLMN identity of the visited place from a second mobile terminal, and the second mobile terminal being a mobile terminal having moved from a home to the visited place.

In an implementation, the second mobile terminal having moved from the home to the visited place may transmit the request of obtaining the first standard format page to the server so as to obtain the PLMN identity of the visited place.

At block 408: the server extracts the PLMN identity of the visited place from the first standard format page according to the request, and transmits the PLMN identity of the visited place to the second mobile terminal such that the second mobile terminal adds the received PLMN identity of the visited place into an EHPLMN (equivalent home PLMN) list and performs network access according to the EHPLMN list.

In an implementation, after receiving the request transmitted by the second mobile terminal, the server searches for the first standard format page according to the request, extracts the PLMN identity of the visited place from the first standard format page, and then transmits the PLMN identity of the visited place to the second mobile terminal. After obtaining the network identification of the PLMN of the visited place, the second mobile terminal adds the PLMN identity of the visited place into the EHPLMN list.

In an implementation, when the second mobile terminal requests access to the network of the visited place, the network access is performed according to the EHPLMN list. In at least one implementation, the second mobile terminal receives a command of switching on the mobile terminal or disabling the current flight mode input by a user, and starts to search for the network after switching on the mobile terminal or disabling the current flight mode. The second mobile terminal may search for the network according to the network identities in the EHPLMN list. The second mobile terminal may obtain the PLMN identity of the visited place broadcasted by a base station by scanning, and then compares the PLMN identity of the visited place obtained by scanning with stored each PLMN identity in the EHPLMN list. When the second mobile terminal determines that the PLMN identity of the visited place transmitted by the base station is consistent with any one of the network identities in the EHPLMN list in the mobile terminal, the mobile terminal may initiate network registration and establish a communication connection with the network of the visited place.

By means of the implementation of the present disclosure, the server generates the standard format page which includes the first filling entry, the first filling entry having the default filling value and being configured to be filled with the PLMN identity of the visited place; the server transmits the standard format page to the first mobile terminal located at the visited place; the server receives the first standard format page transmitted by the first mobile terminal, the first standard format page being a standard format page in which the first filling entry has been filled with the filling value; the server identifies the first standard format page and saves the first standard format page. The server unifies format of the PLMN identity of the visited place with which the mobile terminal fills the standard format page, such that the server can identify the PLMN identity of the visited place in the standard format page, thereby improving the accuracy of the server identifying the PLMN identity of the visited place.

Figure 5:
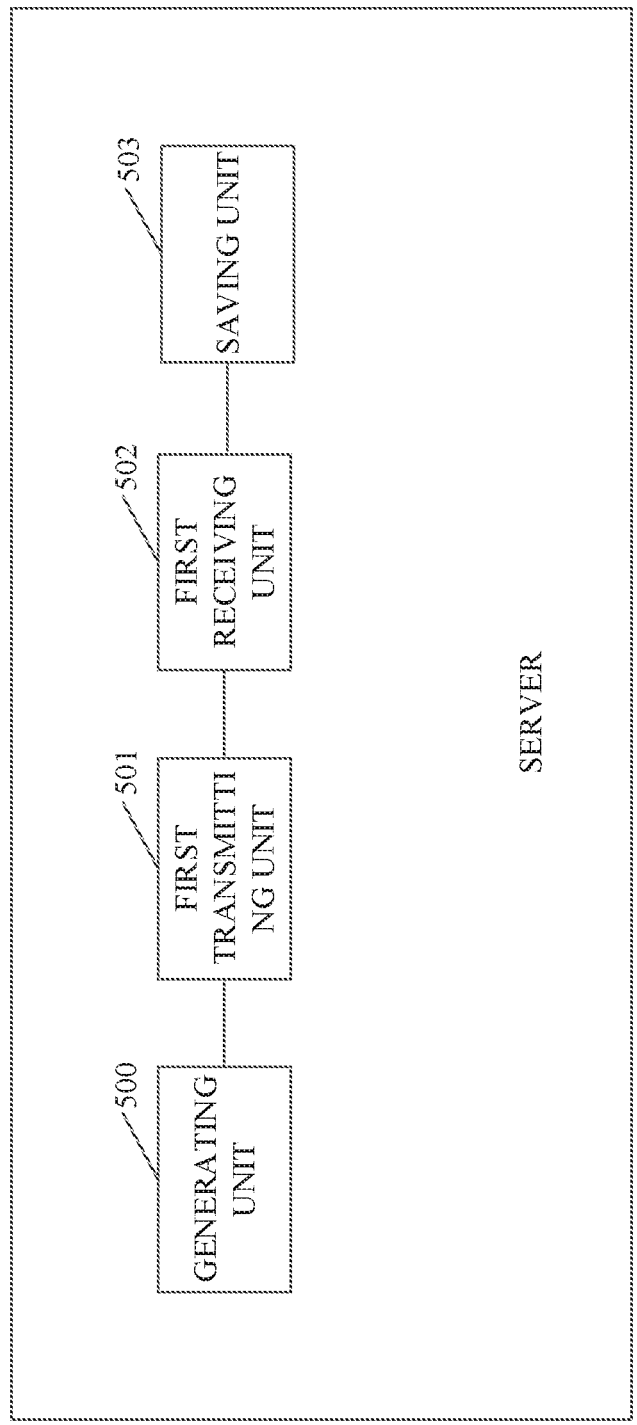
FIG. 5 is a schematic structural diagram of a server according to an implementation of the present disclosure.

Referring to FIG. 5, a schematic structural diagram of a server according to an implementation of the present disclosure is illustrated. As illustrated in FIG. 5, the server includes a generating unit 500, a first transmitting unit 501, a first receiving unit 502, and a saving unit 503. The generating unit 500, the first transmitting unit 501, and the first receiving unit 502 can be integrated into one processor, and the saving unit 503 can be implemented as a memory or memory unit.

The generating unit 500 is configured to generate a standard format page which includes a first filling entry, the first filling entry having a default filling value and being configured to be filled with a PLMN identity of a visited place The first transmitting unit 501 is configured to transmit the standard format page generated by the generating unit 500 to the first mobile terminal located at the visited place.

The first receiving unit 502 is configured to receive a first standard format page transmitted by the first mobile terminal, the first standard format page is a standard format page in which the first filling entry has been filled with the filling value.

The saving unit 503 is configured to identify the first standard format page received by the first receiving unit and saves the first standard format page.

In an implementation, since there are various types of mobile terminals as well as various types of formats of transmitted PLMN identities of visited places, the server has to unify the standard formats of PLMN identities of visited places transmitted by mobile terminals, such that PLMN identities of visited places transmitted by various mobile terminals can be correctly identified. Thus, the server can transmit a standard format page to mobile terminals. The standard format page includes at least one filling entry having a default filling value. The at least one filling entry includes a first filling entry configured to prompt the first mobile terminal to fill the first filling entry with the PLMN identity of the visited place.

In one implementation, the standard format page may further include a second filling entry and a third filling entry. The second filling entry is configured to be filled with an identity of an operator to which a SIM card of the first mobile terminal belongs, while the third filling entry is configured to be filled with an identity of an area to which the visited place belongs. In at least one implementation, the content of the standard format page is as illustrated in FIG. 3. The standard format page includes K entries, where K is a positive integer, such as 1, 3, 5, 9, 12 and so forth. In the standard format page, the first filling entry is configured to store the PLMN identity of the visited place (VPLMN). In at least one implementation, the standard format page may further include the second filling entry configured to save the identity of the operator to which the SIM card of the first mobile terminal belongs. In at least one implementation, the standard format page may further include the third filling entry configured to save the identity of the area to which the visited place belongs.

In an implementation, the server transmits the standard format page to the first mobile terminal located at the visited place after generating the standard format page.

In an implementation, the first mobile terminal receives the standard format page and fills the first filling entry with the PLMN identity of the visited place stored in the first mobile terminal according to the type of the filling value in the first filling entry in the standard format page, so as to generate the first standard format page and transmit the generated first standard format page to the server.

In an implementation, after receiving the first standard format page transmitted by the first mobile terminal, the server identifies the first standard format page according to the standard format, and finally, saves the identified first standard format page.

Figure 6:
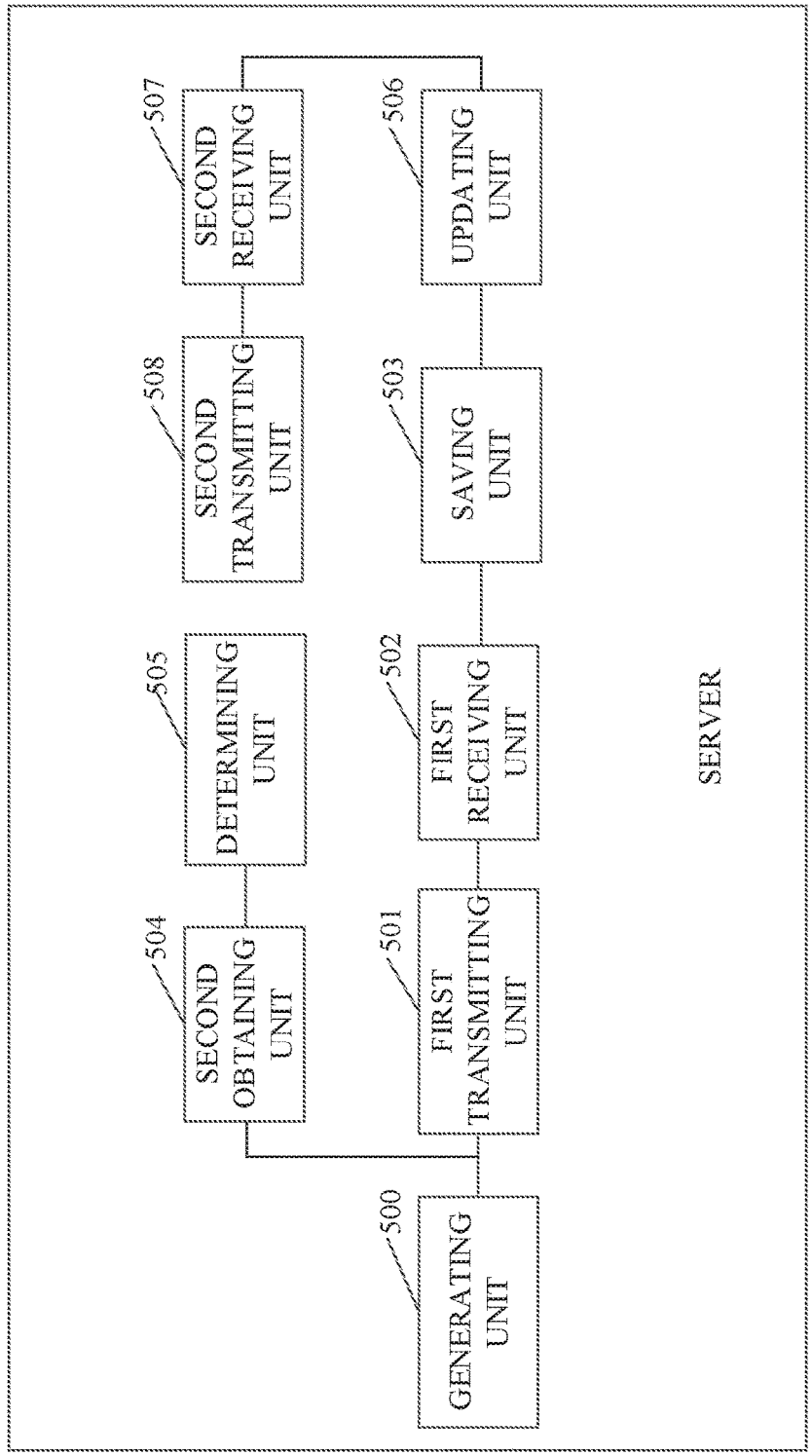
FIG. 6 is a schematic structural diagram of another server according to an implementation of the present disclosure.

In one implementation, as illustrated in FIG. 6, the server further includes a second obtaining unit 504 and a determining unit 505.

The second obtaining unit 504 is configured to obtain location information of the first mobile terminal.

The determining unit 505 is configured to determine that the first mobile terminal is located at the visited place based on the location information of the first mobile terminal.

In an implementation, the server may transmit a request of obtaining the location information to the first mobile terminal which may be positioned by the GPS (Global Positioning System) or base stations in a mobile operation network. The GPS-based positioning method positions the first mobile terminal by means of a GPS unit of the first mobile terminal transmitting its own position information to a background positioning program. The positioning method utilizing base stations positions the first mobile terminal based on the distance from each of the base stations to the first mobile terminal. In the latter method, the first mobile terminal is not required to be capable of positioning itself utilizing the GPS, however, the accuracy greatly depends on the distribution of the base stations and their coverage ranges. The first mobile terminal transmits the location information of the first mobile terminal to the server after positioning such that the server obtains the location of the first mobile terminal.

In an implementation, the server determines whether the first mobile terminal is located at the visited place after obtaining the location information of the first mobile terminal. The standard format page is transmitted to the first mobile terminal when the first mobile terminal is located at the visited place.

In one implementation, as illustrated in FIG. 6, the server further includes an updating unit 506.

The updating unit 506 is configured to update, based on the first standard format page, a pre-saved second standard format page in which the first filling entry has been filled with the filling value.

In an implementation, the server may substitute the first standard format page for the pre-saved second standard format page, such that the standard format page stored in the server is (e.g., always) the newest standard format pages. The second standard format page is a standard format page in which the first filling entry has been filled with the filling value, and the PLMN identity of the visited place in the first filling entry in the second standard format page is of the same type as the PLMN identity of the visited place in the first filling entry in the first standard format page.

As one implementation, as illustrated in FIG. 6, the server further includes a second receiving unit 507 and a second transmitting unit 508.

The second receiving unit 507 is configured to receive a request of obtaining the PLMN identity of the visited place from a second mobile terminal, the second mobile terminal being a mobile terminal having moved from a home to the visited place;

The second transmitting unit 508 is configured to extract the PLMN identity of the visited place from the first standard format page according to the request, and transmitting the PLMN identity of the visited place to the second mobile terminal such that the second mobile terminal adds the received PLMN identity of the visited place into an EHPLMN (equivalent home PLMN) list and performs network access according to the EHPLMN list.

In an implementation, the second mobile terminal having moved from the home to the visited place may transmit the request of obtaining the first standard format page to the server so as to obtain the PLMN identity of the visited place.

In an implementation, after receiving the request transmitted by the second mobile terminal, the server searches for the first standard format page according to the request, extracts the PLMN identity of the visited place from the first standard format page, and then transmits the PLMN identity of the visited place to the second mobile terminal. After obtaining the network identification of the PLMN of the visited place, the second mobile terminal adds the PLMN identity of the visited place into the EHPLMN list.

In an implementation, when the second mobile terminal requests access to the network of the visited place, the network access is performed according to the EHPLMN list. In at least one implementation, the second mobile terminal receives a command of switching on the mobile terminal or disabling the current flight mode input by a user, and starts to search for the network after switching on the mobile terminal or disabling the current flight mode. The second mobile terminal may search for the network according to the network identities in the EHPLMN list. The second mobile terminal may obtain the PLMN identity of the visited place broadcasted by a base station by scanning, and then compares the PLMN identity of the visited place obtained by scanning with stored each PLMN identity in the EHPLMN list. When the second mobile terminal determines that the PLMN identity of the visited place transmitted by the base station is consistent with any one of the network identities in the EHPLMN list in the mobile terminal, the mobile terminal may initiate network registration and establish a communication connection with the network of the visited place.

By means of the implementation of the present disclosure, the server generates the standard format page which includes the first filling entry, the first filling entry having the default filling value and being configured to be filled with the PLMN identity of the visited place; the server transmits the standard format page to the first mobile terminal located at the visited place; the server receives the first standard format page transmitted by the first mobile terminal, the first standard format page being a standard format page in which the first filling entry has been filled with the filling value; the server identifies the first standard format page and saves the first standard format page. The server unifies format of the PLMN identity of the visited place with which the mobile terminal fills the standard format page, such that the server can identify the PLMN identity of the visited place in the standard format page, thereby improving the accuracy of the server identifying the PLMN identity of the visited place.

Figure 7:
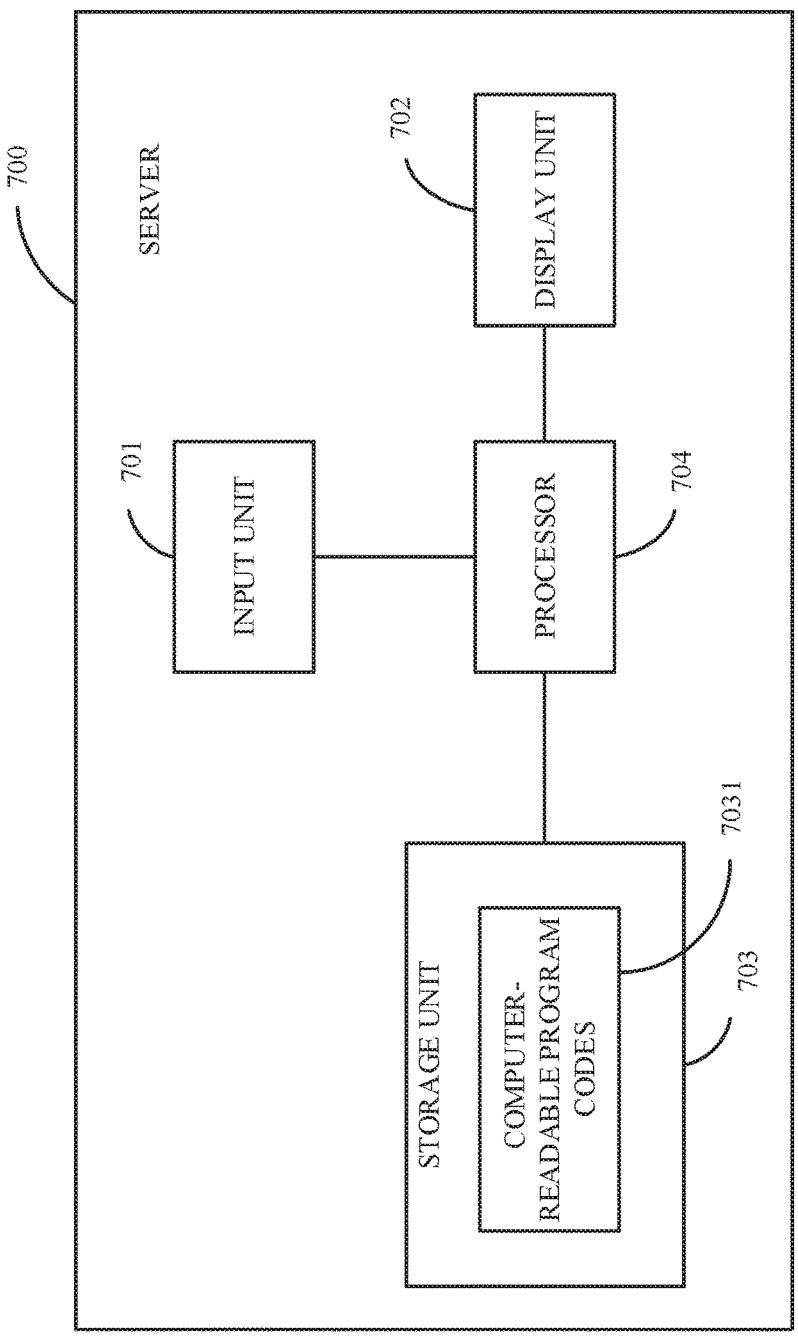
FIG. 7 is a schematic structural diagram of another server according to an implementation of the present disclosure.

Referring to FIG. 7, a schematic structural diagram of a server according to an implementation of the present disclosure is illustrated. As illustrated in FIG. 7, the server 700 includes an input unit 701, a display unit 702, a storage unit 703, and a processor 704. The input unit 701, the display unit 702, and the storage unit 703 are electrically connected to the processor 704.

The input unit 701 is configured to input information, such as letters. The input unit 701 may be but not limited to a physical keyboard, a touch-screen, or a combination of the physical keyboard and the touch-screen.

The display unit 702 is configured to display visual information, such as texts, images. The display unit 702 may be an LED display screen.

The storage unit 703 is configured to store one or more computer-readable program codes 7031. The storage unit 703 can be a read-only memory (ROM), a random access memory (RAM), a USB-disk, a removable hard disk, and so forth.

The processor 704 can include multiple cores for multi-thread or parallel processing.

In an implementation, the processor 704 is configured to execute the one or more computer-readable program codes 7031 to: generate a standard format page which comprises a first filling entry, the first filling entry having a default filling value and being configured to be filled with a PLMN identity of a visited place; transmit the standard format page to the first mobile terminal located at the visited place; receive a first standard format page transmitted by the first mobile terminal, the first standard format page being a standard format page in which the first filling entry has been filled with the filling value; and identify and save the first standard format page.

In an implementation, before the processor 704 is further configured to execute the one or more computer-readable program codes 7031 to transmit the standard format page to the first mobile terminal located at the visited place, the processor 704 is further configured to execute the one or more computer-readable program codes 7031 to: obtaining location information of the first mobile terminal; and determining that the first mobile terminal is located at the visited place, based on the location information of the first mobile terminal.

In an implementation, wherein the processor 704 is further configured to execute the one or more computer-readable program codes 7031 to: based on the first standard format page, update a pre-saved second standard format page in which the first filling entry has been filled with the filling value.

In an implementation, after the processor 704 is further configured to execute the one or more computer-readable program codes 7031 to, based on the first standard format page, update the pre-saved second standard format page in which the first filling entry has been filled with the filling value, the processor 704 is further configured to execute the one or more computer-readable program codes 7031 to: receive a request of obtaining the PLMN identity of the visited place from a second mobile terminal, the second mobile terminal being a mobile terminal having moved from a home to the visited place; and extract the PLMN identity of the visited place from the first standard format page according to the request, and transmit the PLMN identity of the visited place to the second mobile terminal such that the second mobile terminal adds the received PLMN identity of the visited place into an EHPLMN list and performs network access according to the EHPLMN list.

In an implementation, the standard format page further comprises a second filling entry configured to be filled with an identity of an operator to which a subscriber identity module (SIM) card of the first mobile terminal belongs.

In an implementation, the standard format page further comprises a third filling entry configured to be filled with an identity of an area to which the visited place belongs.

In an implementation, the processor 704 is further configured to execute the one or more computer-readable program codes 7031 to obtain the location information of the first mobile terminal, comprises: the processor 704 being further configured to execute the one or more computer-readable program codes 7031 to: transmit a request of obtaining the location information to the first mobile terminal; and receive the location information of the first mobile terminal transmitted by the first mobile terminal, wherein the location information is obtained by positioning by the first mobile terminal.

In an implementation, after the processor 704 is further configured to execute the one or more computer-readable program codes 7031 to obtain the location information of the first mobile terminal, the processor 704 is further configured to execute the one or more computer-readable program codes 7031 to: determine whether the first mobile terminal is located at the visited place; and transmit the standard format page to the first mobile terminal when the server determines that the first mobile terminal is located at the visited place.

In an implementation, the processor 704 being further configured to execute the one or more computer-readable program codes 7031 to, based on the first standard format page, update a pre-saved second standard format page in which the first filling entry has been filled with the filling value, comprises: the processor 704 being further configured to execute the one or more computer-readable program codes 7031 to substitute the first standard format page for the pre-saved second standard format page, the second standard format page being a standard format page in which the first filling entry has been filled with the filling value, the PLMN identity of the visited place in the first filling entry in the second standard format page being of the same type as the PLMN identity of the visited place in the first filling entry in the first standard format page.

By means of the implementation of the present disclosure, the server generates the standard format page which includes the first filling entry, the first filling entry having the default filling value and being configured to be filled with the PLMN identity of the visited place; the server transmits the standard format page to the first mobile terminal located at the visited place; the server receives the first standard format page transmitted by the first mobile terminal, the first standard format page being a standard format page in which the first filling entry has been filled with the filling value; the server identifies the first standard format page and saves the first standard format page. The server unifies format of the PLMN identity of the visited place with which the mobile terminal fills the standard format page, such that the server can identify the PLMN identity of the visited place in the standard format page, thereby improving the accuracy of the server identifying the PLMN identity of the visited place.

The foregoing described apparatus implementations are merely exemplary. The units described as separate portions may or may not be physically separate, and portions seeming units may or may not be physical units, i.e., these may be located in one place, or may be distributed on multiple network units. A part or all of the units may be selected according to actual requirements to achieve the purposes of the solutions of the implementations. Persons skilled in the art may understand and implement without creative effort.

The steps in the methods according to the implementations of the present disclosure may be merged or removed, and their sequence may be adjusted, according to actual requirements.

The units or units in the apparatus according to the implementations of the present disclosure may be merged, divided or removed, according to actual requirements.

The units or units according to the implementations of the present disclosure may be realized by a General Integrated Circuit (such as CPU) or an Application Specific Integrated Circuit (ASIC).

From the description of the foregoing implementations, persons skilled in the art should be fully aware that each implementation may be realized by means of software as well as necessary general hardware platform, or naturally by means of hardware. Based on such a concept, the foregoing technical solutions essentially, or a portion thereof contributing to the prior art, may be embodied in a form of a software product. The computer software product may be stored in a computer-readable storage medium, such as a ROM/RAM, a magnetic disc, an optical disk and so forth, and includes several commands for commanding computer equipment (a personal computer, a server, a network device, etc.) to perform the methods described in various implementations or a portion of one implementation.

The foregoing implementations are not intended to limit the protection scope of the present disclosure. Any amendments, equivalent substitutions, improvements and so forth within the spirit and principle of the present disclosure should be included within the protection scope of the present disclosure.

What is claimed is:

1. A method for saving a standard format page, comprising:
   generating, by a server, a standard format page which comprises a first filling entry, the first filling entry having a default filling value and being configured to be filled with a PLMN identity of a visited place;
   obtaining, by the server, location information of a first mobile terminal;
   determining, by the server, that the first mobile terminal is located at the visited place, based on the location information of the first mobile terminal;
   transmitting, by the server, the standard format page to the first mobile terminal located at the visited place;
   receiving, by the server, a first standard format page transmitted by the first mobile terminal, the first standard format page being a standard format page in which the first filling entry has been filled by the first mobile terminal with the default filling value; and
   identifying and saving, by the server, the first standard format page.

2. The method of claim 1, further comprising:
   updating based on the first standard format page, by the server, a pre-saved second standard format page in which the first filling entry has been filled with the default filling value.

3. The method of claim 2, wherein after updating based on the first standard format page, by the server, the pre-saved second standard format page in which the first filling entry has been filled with the filling value, the method further comprises:

receiving, by the server, a request of obtaining the PLMN identity of the visited place from a second mobile terminal, the second mobile terminal being a mobile terminal having moved from a home to the visited place; and extracting, by the server, the PLMN identity of the visited place from the first standard format page according to the request, and transmitting the PLMN identity of the visited place to the second mobile terminal such that the second mobile terminal adds the received PLMN identity of the visited place into an EHPLMN list and performs network access according to the EHPLMN list.

4. The method of claim 1, wherein the standard format page further comprises a second filling entry and a third filling entry, the second filling entry being configured to be filled with an identity of an operator to which a subscriber identity module (SIM) card of the first mobile terminal belongs, the third filling entry being configured to be filled with an identity of an area to which the visited place belongs.

5. A server, comprising:
a generating unit configured to generate a standard format page which comprises a first filling entry, the first filling entry having a default filling value and being configured to be filled with a PLMN identity of a visited place;
a second obtaining unit configured to obtain location information of a first mobile terminal;
a determining unit configured to determine that the first mobile terminal is located at the visited place based on the location information of the first mobile terminal;
a first transmitting unit configured to transmit the standard format page generated by the generating unit to the first mobile terminal located at the visited place;
a first receiving unit configured to receive a first standard format page transmitted by the first mobile terminal, the first standard format page being a standard format page in which the first filling entry has been filled by the first mobile terminal with the default filling value; and
a saving unit configured to identify the first standard format page received by the first receiving unit and save the first standard format page.

6. The server of claim 5, further comprising:
an updating unit configured to update, based on the first standard format page, a pre-saved second standard format page in which the first filling entry has been filled with the default filling value.

7. The server of claim 6, further comprising:
a second receiving unit configured to receive a request of obtaining the PLMN identity of the visited place from a second mobile terminal, the second mobile terminal being a mobile terminal having moved from a home to the visited place; and
a second transmitting unit configured to extract the PLMN identity of the visited place from the first standard format page according to the request, and transmitting the PLMN identity of the visited place to the second mobile terminal such that the second mobile terminal adds the received PLMN identity of the visited place into an EHPLMN (equivalent home PLMN) list and performs network access according to the EHPLMN list.

8. The server of claim 5, wherein the standard format page further comprises a second filling entry and a third filling entry, the second filling entry being configured to be filled with an identity of an operator to which a subscriber identity module (SIM) card of the first mobile terminal belongs, the third filling entry being configured to be filled with an identity of an area to which the visited place belongs.

* * * * *